US006733828B2

(12) United States Patent
Chao et al.

(10) Patent No.: US 6,733,828 B2
(45) Date of Patent: May 11, 2004

(54) METHOD OF FABRICATING NANOSTRUCTURED MATERIALS

(76) Inventors: Kuei-Jung Chao, 101, Sec. 2 Kuang Fu Road, Hsinchu (TW), 300;
Chia-Min Yang, No. 12-5, Lin 14, Ta-Min Li, Hsin-Hsing District, Kaohsiung (TW)

( * ) Notice: Subject to any disclaimer, the term of this patent is extended or adjusted under 35 U.S.C. 154(b) by 4 days.

(21) Appl. No.: 10/059,995

(22) Filed: Jan. 29, 2002

(65) Prior Publication Data

US 2003/0152759 A1 Aug. 14, 2003

(51) Int. Cl.$^7$ .............................. B05D 5/00; B05D 7/22
(52) U.S. Cl. ...................... 427/239; 427/230; 427/243; 427/247; 427/399; 427/405; 427/407.1; 427/409; 427/419.1; 427/419.2
(58) Field of Search .................... 427/243, 247, 427/230, 239, 399, 405, 402, 419.1, 409, 407.1, 419.2

(56) References Cited

U.S. PATENT DOCUMENTS

| 5,942,208 | A | * | 8/1999 | Ryoo et al. ............... 423/705 |
| 6,326,326 | B1 | * | 12/2001 | Feng et al. ............... 502/62 |
| 6,372,687 | B1 | * | 4/2002 | Hagemeyer et al. ........ 502/326 |
| 6,544,923 | B1 | * | 4/2003 | Ying et al. ............... 502/159 |
| 6,548,440 | B1 | * | 4/2003 | Pham et al. ............... 502/71 |

* cited by examiner

Primary Examiner—Shrive P. Beck
Assistant Examiner—Kirsten Crockford Jolley
(74) Attorney, Agent, or Firm—Fish & Richardson P.C.

(57) ABSTRACT

A method of confined synthesis of nanostructured material inside a mesoporous material. The method includes the step of providing mesoporous material having uniform and ordered mesopores. Next, a monolayer of charged functional group is attached on the pore surface of mesoporous host material by reacting with functional molecule. A oppositely-charged molecule is incorporated into the confined space of mesoporous material by either ion exchange or incipient wetness impregnation. Finally, the incorporated molecule is reduced or oxidized or further reacted with secondarily-incorporated molecule to form nanostructured material in mesoporous material.

23 Claims, 12 Drawing Sheets

Mesoporous silicas

1. Surface functionalization to carry charges
2. Precursor incorporation
3. Further treatments Composites of nanostructured materials and mesoporous silicas

METHOD OF FABRICATING NANOSTRUCTURED MATERIALS

BACKGROUND OF THE INVENTION

1. Field of the Invention

The present invention relates in general to a method of fabricating nanostructured materials. More particularly, it relates to a method of templating synthesis of nanostructured materials in functionalized mesoporous materials.

2. Description of the Related Art

Nanostructured materials have unique optical, electrical, magnetic and mechanical properties compared with bulk materials. The reduction of the size of the material results in not only the quantum confinement phenomena due to the changes in the density and gap of the electronic energy level, but also the increase of the ratio of surface atoms to bulk atoms. Therefore, they have found extensive applications in catalysis as well as miniaturized electronic and optical devices. Nanostructured materials include nanoparticles, nanorods and nanowires. Template synthesis within a confined space of host, or "ship-in-a-bottle" synthesis, is an effective method to prepare uniform sized nanomaterials. The morphology of nanomaterials can be controlled by the void structure of the host. Examples of suitable hosts include anodic alumina membranes (Ex: U.S. Pat. No. 6,231,744 B1), carbon nanotube (e.g. J. Sloan et. al., J. Chem. Soc., Chem. Commun., (1999) 699; A. Govindaraj et. al., Chemistry of Materials, 12 (2000) 202), self-assembled diblock copolymer template (T. Thurn-Albrecht et. al., Science 290 (2000) 2126) and molecular sieves (Ex: M. Sasaki et. al., Microporous and Mesoporous Materials 21 (1998) 597; Y. J. Han et. al., Chemistry of Materials 12 (2000) 2068; Z. Liu et. al., Angew. Chem. Int. Ed. 39 (2000) 3107). In addition, various metal nanoparticles were synthesized in the confined space of micelles consisting of surfactant or polyelectrolytes (Ex: U.S. Pat. Nos. 5,925,463, 6,054,507, 6,090,746, 6,099, 964, 6,103,868, 6,262,129 B1 and 6,325,910 B1). Another method of fabricating nanoporous materials involves direct templating of lyotropic liquid-crystalline phases of amphiphilic surfactants or block-copolymer (U.S. Pat. Nos. 6,054,111 and 6,203,925 B1). Most of these hosts provide spherical voids or one-dimensional channels to fabricate nanowire structures. In comparison, surfactant templated, ordered mesoporous molecular sieves including MCM-series and SEA-series mesoporous silicas, have tunable pore size in the range of 1.0–50.0 nm, as well as controllable three-dimensional pore structures (U.S. Pat. No. 5,145,816 and 5,264,203; Q. Huo et.al., Nature 368 (1994) 317; D. Zhao et. al., Science 279 (1998) 548). They can be fabricated into various morphologies including powder, fiber, monolith and thin film, which provide further flexibility in processing nanomaterials. Therefore, mesoporous materials are promising hosts for fabrication of nanostructured materials.

Template synthesis of nanostructured materials, such as metals, metal oxides or semiconductors, in mesoporous materials generally starts from incorporation of suitable precursors. Several methods including incipient wetness impregnation, ion exchange, or gas-phase chemical vapor infiltration are utilized. For practical usage of mesoporous materials as host, either high loading or high degree of dispersion of nanomaterials in the host is critical. For these incorporation methods, repeated incorporation cycles or long vapor treatment time is usually needed to achieve high precursor loading. The dispersion degree is usually low, and the precursors diffuse easily to the outer surface of the host to form large materials during subsequent processes. Therefore, an efficient method for fabricating nanostructured materials in mesoporous hosts is needed.

In a separate field of environmental chemistry, methods have been developed to functionalize mesoporous silica to serve as sorbents for separation and sensors. The pore surface of mesoporous silica is functionalized to carry sulfur or nitrogen-containing functional group, which can react and adsorb metal ions in the solution (U.S. Pat. Nos. 6,251,280 B1, 6,306,301 B1, 6,310,110 B1 and 6,326,326 B1). The coverage of surface functionality can be finely tuned so that a monolayer of functional groups on the pore surface of mesoporous silica can be formed. The interaction between functional groups and metal ions is relatively weak, and limited amount of metal ions can be adsorbed on the pore surface of mesoporous silica. There remains a need to explore the possibility of applying surface functionalization in fabricating nanostructured materials in mesoporous hosts.

SUMMARY OF THE INVENTION

The object of the present invention is to provide a method of fabricating nanostructured materials in functionalized mesoporous materials. Mesoporous materials are functionalized to bear charged functional groups on the pore surface, and are applied for template synthesis of nanostructured materials. Long-ranged electrostatic interaction between the surface charged groups and the precursor salts results in high precursor loading in the pore of the host. In addition, the precursor distributes uniformly in the functionalized mesoporous host. After subsequent reaction, such as reduction, oxidization or complexation, the resulting nanostructured materials will have high degree of dispersion.

Mesoporous host material is preferably to maximize the number density of active groups on the pore surface by, for example, rehydration process. It then reacts with functional molecules to form a monolayer of positively or negatively-charged functional groups on the pore surface of mesoporous host. A solution of metal salts or molecules bearing opposite charges is mixed with the functionalized mesoporous host, and may be ion exchanged into the mesopores. Alternatively, metal salts or molecules with high concentration in the solution may nucleate and precipitate inside the mesopores, resulting high loading of the complex. Finally, the confined metal salts or molecules in the mesopores can be reduced or oxidized to form nanostructured metal or metal oxide; or it may react with secondary ligands or reactants to form functional nanostructured crystals or precipitates inside the mesoporous host materials.

According to the present invention, the nanostructured materials are not restricted to metal and metal oxide. Insoluble metal salts or metal-ligand hybrids can also be fabricated inside the mesoporous hosts. Appropriate charged molecule or metal complex is first incorporated into the functionalized host. Upon introduction of the ligand, the insoluble hybrid precipitates immediately inside the mesopores.

In the present invention, the template-synthesized nanostructured materials not only impart mechanical reinforcement to the host mesoporous material, but also extend the applications of the nanocomposites. The applications depend on the properties of the nanoparticles. For example, $Fe_2O_3$ can be used as a magnetic recorder, while Pt nanoparticles perform as better catalyst for hydrogenation reactions. Confined bimetallic RuPt or PdAg nanoparticles may be used as catalysts for fuel cell applications.

BRIEF DESCRIPTION OF THE DRAWINGS

The present invention will become more fully understood from the detailed description given herein below and the accompanying drawings, given by way of illustration only and thus not intended to be limitative of the present invention.

DETAILED DESCRIPTION OF THE INVENTION

Figure 1A:
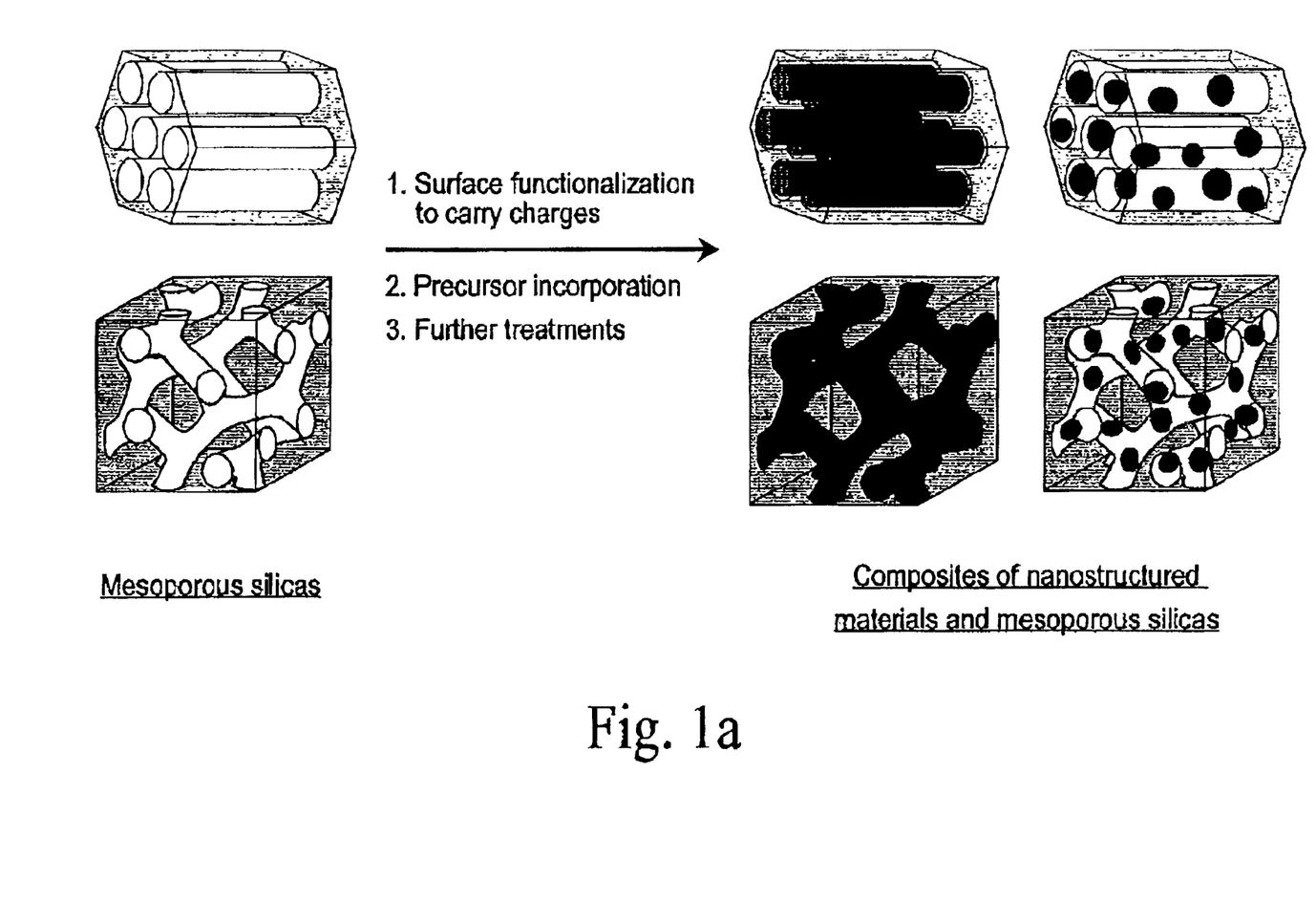
FIG. 1a is an illustration of fabrication of nanostructured materials in functionalized mesoporous silicas with two-dimensional hexagonal structure and three-dimensional cubic structure or other pore structure according to the present invention, wherein the silica host is subjected to (1) surface functionalization to form charged functional groups on the pore surface, (2) incorporation of oppositely charged precursors or molecules, and (3) further treatment to form nanostructured materials in the mesoporous materials, such that the nanostructured materials can be fully occupied or dispersed in the pores of the mesoporous materials.
Figure 1B:
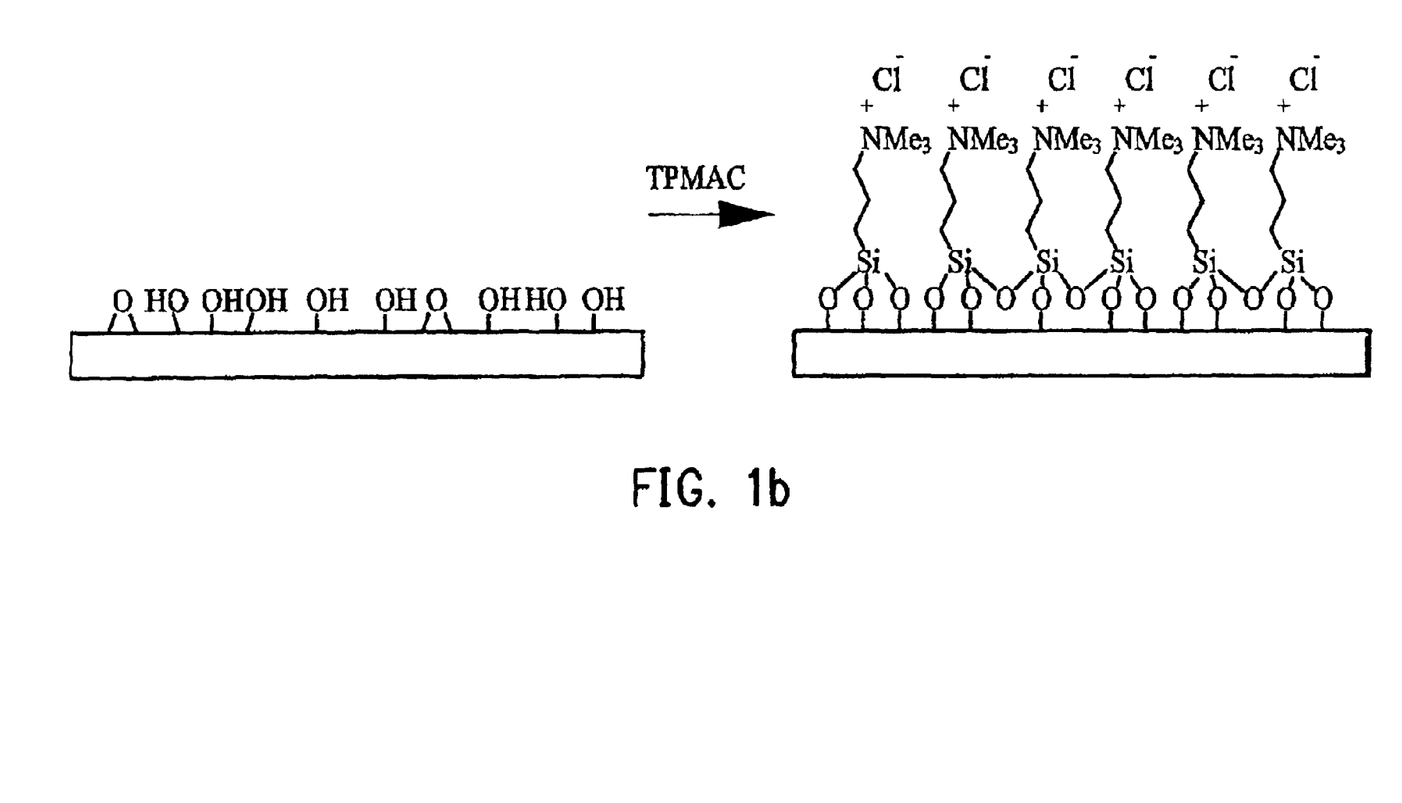
FIG. 1b is a schematic illustration of functionalization of pore surface of mesoporous silicas to carry charges according to the present invention.

According to the present invention (illustrated in FIG. 1a and FIG. 1b), a functionalized mesoporous material is served as the host for template synthesis of nanostructured materials. For preparation of the functionalized mesoporous material, an organized assembly of functional molecules containing a functional group on a terminal end is attached to available surface with an attaching group. The functional group is chosen to be ionic, or to become ionic under certain condition such as low or high pH environment. Such functional groups include, but are not limited to, tetraalkylammonium salts, amines, alcohol, carboxylic acids, sulfonic acids and phosphonic acids. The attaching group of the functional molecules include but not limited to siloxane, chlorosilane, amine, alcohol, and combination thereof.

Examples of functional molecules which may be employed in the present invention include but not limited to N-trimethoxysilylpropyl-N, N, N-trimethylammonium chloride (TPMAC), N-trimethoxysilylpropyl-N, N, N-tri-n-butylammonium chloride (TPBAC), N-trimethoxysilylpropyl-3-guanidine chloride (TSPGC), 3-aminopropyltrimethoxysilane (APTS), N-(2-aminoethyl)-3-aminopropyltrimethoxysilane (AAPTS), bis[3-(trimethoxysilyl)propyl]ethylenediamine (BTPED), 3-trihydroxysilylpropylmethylphosphonate, sodium salt (TPMP), N-[(3-trimethoxysilyl)propyl]ethylenediamine triacetic acid, trisodium salt (TPEDA), diethylphosphatoethyltrimethoxysilane (DPETS) and diethyl (trimethoxysilylpropyl) malonate (DTSPM).

The mesoporous host material in the present invention may be any mesoporous material with highly ordered and monodisperse mesopores. The pore diameter is in the range of 0.1 to 50 nm. Such materials include, but not limited to, metal oxides, such as silica ($SiO_2$), titania ($TiO_2$), zircona ($ZrO_2$) and tin oxide ($SnO_2$). The mesoporous material can be in powdery, fibery, monolith or thin film forms.

The method of the present invention preferably includes the step of maximizing the surface active group for reacting with functional molecules to form a charged monolayer. For example, the pore surface of mesoporous silica has silanol groups for functionalization, which involves the hydrolysis and condensation of functional silane with silanol group. For calcined mesoporous silicas, the number density of surface silanol groups can be increased and maximized by rehydration. Rehydration has the steps of wetting and removing excess water. The wetting process may be accomplished by heating or boiling the mesoporous material in water, or by heating the mesoporous material under saturated water vapor atmosphere. The boiling is preferably done at a predetermined temperature of around 100° C. for predetermined time of 1–4 hours. For water vapor treatment, it is preferably done at a predetermined temperature of 100–150° C. for predetermined time of 0.5–2 hours. The excess water is removed by evaporation in vacuum or under gas flow. Alternatively, azeotropic distillation may also be used to remove unreacted water, but it is more suitable for small scale (laboratory) production. The suitable distillation solvents include, but not limited to, benzene, toluene, chloroform and combinations thereof. The azeotropic distillation is done with either a Dean-Stark trap or a standard distillation apparatus.

After rehydration, functional molecules is introduced to the mesoporous host material. It can be accomplished either by addition of a solution of functional molecules to the mesoporous host material, or by gas phase reaction of vaporized functional molecules with mesoporous material. For solution functionalization of mesoporous material, the mixture is stirred for a predetermined time permitting permeation of functional molecules throughout the mesopores. It may occur at ambient temperature for several days, or as a result of heating the mixture at reflux for several hours. The solvent is selected from non-aqueous solvent, for example, toluene, benzene or chloroform. After reaction, the functionalized mesoporous material is washed to remove any by-products, unreacted functional molecules and remaining solvent. Washing is preferably done with, for example, ethanol, 2-propanol or acetone. It is followed by drying the washed material, which may be done open or under vacuum.

Alternatively, functionalization may be performed using as-synthesized mesoporous silica instead of calcined mesoporous silica. The interaction between templating surfactant and silica is not strong in as-synthesized mesoporous silica, and the surfactant may be extracted by solvent such as ethanol. Solution functionalization of as-synthesized mesoporous silica is applied by mixing with ethanol solution of functional molecules. Templating surfactants are replaced and exchanged with functional molecules, which then react with silica surface to form a monolayer of functional groups.

Functionalized mesoporous material is used to fabricate nanostructured materials. An oppositely-charged molecule is introduced into the mesopores through electrostatic interaction. For example, TPMAC-functionalized mesoporous silica is used to incorporate negatively-charged molecules, and TPEDA-functionalized mesoporous silica is used to incorporate positively-charged molecules. The negatively-charged molecules include, but not limited to, inorganic metal complexes and organic molecules. Negatively-charged inorganic metal complexes include, but not limited to, (1) halogen complexes, such as $PtCl_6^{2-}$, $AuCl_4^-$, $PdCl_6^{2-}$, $RuCl_6^{2-}$, (2) cyanide complexes, such as $Fe(CN)_6^{3-}$, $Fe(CN)_6^{4-}$, $Ag(CN)_2^-$, $Ni(CN)_4^{2-}$, (3) hydroxyl or oxo complexes, such as $Al(OH)_4^-$, $MnO_4^-$, $ReO_4^-$, $TcO_4^-$, Negatively-charged molecules further include inorganic acid (such as $So_4^{2-}$, $NO_3^-$, $ClO_4^-$, $IO_3^-$, etc.), organic acid (such as oxalate, acetic acid, squarate, etc.), negatively-charged macromolecules (such as porphyrin, etc.) or negatively-charged polymers (such as polystyrenesulfonate, etc.). Positively-charged molecules include, but not limited to, (1) metal ions, such as $Ag^+$, $Al^{3+}$, $Am^{3+}$, $As^{3+}$, $Au^+$, $Au^{3+}$, $Ba^{2+}$, $Be^{2+}$, $Bi^{3+}$, $Ca^{2+}$, $Cd^{2+}$, $Ce^{3+}$, $Ce^{4+}$, $Cf^{3+}$, $Cm^{3+}$, $Co^{2+}$, $Co^{3+}$, $Cr^{3+}$, $Cr^{6+}$, $Cs^+$, $Cu^+$, $Cu^{2+}$, $Er^{3+}$, $Eu^{3+}$, $Fe^{2+}$, $Fe^{3+}$, $Ga^{3+}$, $Gd^{3+}$, $Hg^{2+}$, $Hg_2^+$, $Ho^{3+}$, $In^{3+}$, $Ir^{3+}$, $Ir^{4+}$, $K^+$, $La^{3+}$, $Li^+$, $Lu^{3+}$, $Mg^{2+}$, $Mn^{2+}$, $Mo^{4+}$, $Mo^{5+}$, $Mo^{6+}$, $Na^+$, $Nb^{5+}$, $Nd^{3+}$, $Ni^{2+}$, $Np^{4+}$, $NpO_{2+}$, $Pb^{2+}$, $Pd^{2+}$, $Po^{2+}$, $Pr^{3+}$, $Pt^{2+}$, $Pu^{3+}$, $Pu^{4+}$, $Pu^{6+}$, $Re^{7+}$, $Rh^{3+}$, $Ru^{4+}$, $Sb^{3+}$, $Sb^{5+}$, $Sc^{3+}$, $Sm^{3+}$, $Sn^{2+}$, $Sr^{2+}$, $Tb^{3+}$, $Th^{4+}$, $Ti^{3+}$, $Tl^+$, $Tl^{3+}$, $Tm^{3+}$, $U^{4+}$, $UO_2^{2+}$, $V^{2+}$, $VO^{2+}$, $V^{3+}$, $V^{5+}$, $W^{6+}$, $Y^{3+}$, $Yb^{3+}$, $Zn^{2+}$, $Zr^{4+}$, (2) metal complexes such as $Pt(NH_3)_6^{2+}$, $Co(NH_3)_6^{2+}$, $Coen_3^{3+}$, $Cuen_3^{2+}$, and (3) organic molecules or polymers bearing positively-charged functional group such as tetraalkylammonium group. Combinations of suitable charged molecules may also be incorporated together into the functionalized mesoporous material.

The incorporation amount of charged molecules depends on the incorporation method. Concentrated or saturated solution of charged molecules is mixed with functionalized mesoporous material, followed by partial evaporation the solvent, filtering and drying the sample. The incorporation method of incipient wetness impregnation results in high loading of charged molecules inside functionalized mesoporous material. Alternatively, a solution of charged molecules is mixed with functionalized mesoporous materials, followed by washing with plenty of solvent, filtering and drying. A monolayer of charged molecules is ion-exchanged and incorporated into the mesopores. The incorporation amount also depends on the number density of active group on the pore surface. Incorporation in mesoporous material with rehydration prior to functionalization generally gives higher loading.

The incorporated charged molecules bear further reactions including, but not limited to, reduction, oxidation, precipitation, and crystallization. The reaction takes place in the confined space of mesoporous material, and nanostructured materials are produced inside the mesopores. Reduction of charged metal complexes results in metal nanostructures. Metal complex is reduced via thermal or photochemical reactions by reducing agent. Suitable reducing agents include, but not limited to, hydrogen gas, NaBH4, alcohol, etc. For densely packed metal nanostructures, hydrogen gas is preferred as reducing agent. The morphology of the metal nanostructure is related to loading amount, pore structure, pore diameter and reduction conditions such as temperature ramping rate, reducing agent concentration, and reduction temperature. For example, metal nanowires, nanoparticles, or nanowire networks can be fabricated in functionalized mesoporous host materials. Using solution of mixed metal complexes for incorporation, various multi-metallic alloy nanostructures such as bimetallic nanoparticles can be prepared.

Alternatively, charged metal complexes may be oxidized by, such as oxygen gas, to form nanostructured metal oxide in functionalized mesoporous material. Or they may be treated with base such as ammonium gas, to precipitate and form metal hydroxide, which transforms to metal oxide upon dehydration or heat treatment. Mixed metal oxide nanostructures can be prepared using solution of mixed metal complexes for incorporation. Metal ions may also react with sulfur-containing reagents, such as $H_2S$, to form confined metal sulfides nanostructures.

Suitable charged molecules can form insoluble crystals or precipitates upon introduction of secondary molecules into the host material. For example, nanostructured Prussian blue $KCo(Fe(CN)_6)$ can be formed by further introducing $CoCl_2$ to $K_3Fe(CN)_6$-incorporated mesoporous material. Another example is the formation of nanostructured metal-squarate complex in the confined space of host by introducing metal ions into squarate-incorporated mesoporous material.

EXAMPLE 1

Synthesis and Functionalization of MCM-41 with TPMAC

The siliceous MCM-41 was prepared by first dissolving cetyltrimethylammonium bromide (CTAB) in ammonia solution. Tetraethyl orthosilicate (TEOS) was then introduced slowly into the solution under stirring. After 2 hours, the precipitate was filtered and dried at ambient temperature. The molar ratio of the reactants was TEOS: CTAB; $NH_4OH$: $H_2O$=1:0.125:69:525. The powder was calcined at 540° C. in air flow.

Figure 2:
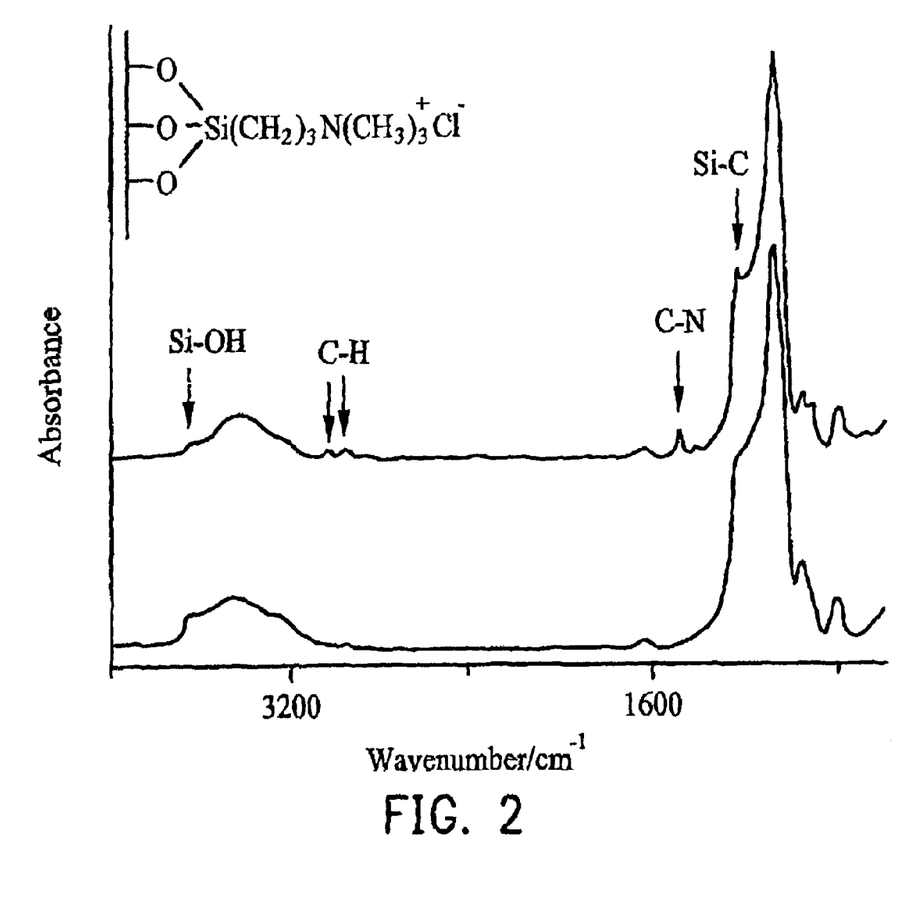
FIG. 2. is a FT-IR spectra of rehydrated MCM-41 and TPMAC-functionalizedd MCM 41 according to the present invention.

The calcined MCM-41 was rehydrated by heating in water at 80° C. for 30 minutes. After filtration, the sample was evacuated and heated at 150° C. for 12 hours to remove excess water. 0.5 g of the dried sample was suspended in 75 mL toluene, and then 5.0 mL of TPMAC was added. The mixture was stirred at room temperature overnight, followed by reflux at 80° C. for 12 hours. The functionalized MCM-41 was washed with toluene and ethanol, and was dried in air. In FIG. 2, decreased IR absorption of silanol groups at 3750 $cm^{+1}$ accompanied by the appearance of absorption peaks of C—H bonds (2900–3000 $cm^{-1}$), C—N bonds (~1490 $cm^{+1}$) and Si—C bonds (~1250 $cm^{-1}$) indicate that the pore surface of MCM-41 was functionalized with TPMAC.

EXAMPLE 2

Synthesis and Functionalization of MCM-48 with TPMAC

For preparation of MCM-48, 27.8 g sodium silicate was first dissolved in 56.0 g water. In a separate bottle, 7.8 g CTAB and 1.4 g neutral surfactant Brij® 30 was mixed in 106.0 g water. The silicate solution was then poured into the surfactant solution and shake vigorously. The mixture was sealed in a polypropylene bottle and heated at 100° C. After 2 days, the pH value of the mixture was adjusted to 10 by acetic acid, and then further heated at 100° C. for another 2 days. The precipitate was filtered and dried, and was calcined at 540° C. in air flow for 6 hours.

The calcined MCM-48 was rehydrated by heating in water at 80° C. for 30 minutes. After filtration, the sample was evacuated and heated at 150° C. for 12 hours to remove excess water. 0.5 g of the dried sample was suspended in 75 mL toluene, and then 5.0 mL of TPMAC was added. The mixture was stirred at room, temperature overnight, followed by reflux at 80° C. for 12 hours. The functionalized MCM-48 was obtained by washing with toluene and ethanol and drying in air.

EXAMPLE 3

Synthesis and Functionalization of SBA-15 with TPMAC

Siliceous SBA-15 was synthesized by first dissolving 4.0 g of Pluronic P123 (commercial name, (polyethylene)$_{20}$-(polypropylene)$_{70}$-(polyethylene)$_{20}$) in a mixture of 30.0 g of water and 120.0 g of 2N HCl aqueous solution. 8.5 g of TEOS was added into the solution, and the mixture was stirred at 40° C. for 20 hours. The mixture was then heated at 80° C. for 2 days. The product was filtered, dried, and them calcined at 540° C. to remove the organic template. Calcined SBA-15 was hydrated by heating in saturated water vapor at 100° C. for 30 minutes. The sample was then evacuated and heated at 150° C. for 12 hours to remove excess water. 0.5 g of dried sample was suspended in 70 mL of toluene, and then 4.0 mL of TPMAC was added. The mixture was stirred at room temperature overnight, followed by reflux at 80° C. for 12 hours. The functionalized SBA-15 (TPMAC-SBA-15) was washed with toluene and ethanol, and was dried in air.

EXAMPLE 4

Functionalization of MCM-41 with TPEDA

Rehydrated MCM-41 was dispersed in aqueous solution of 2 wt % TPEDA for 30 minutes to be functionalized with negative charges (TPEDA-MCM-41). TPEDA-MCM-41 was washed with water and ethanol, dried in air, and cured at 110° C. for 30 minutes.

EXAMPLE 5

Formation of Monometallic Pt. Au and Bimetallic AuPt Nanowire bundles in TPMAC-MCM-41

Figure 3A:
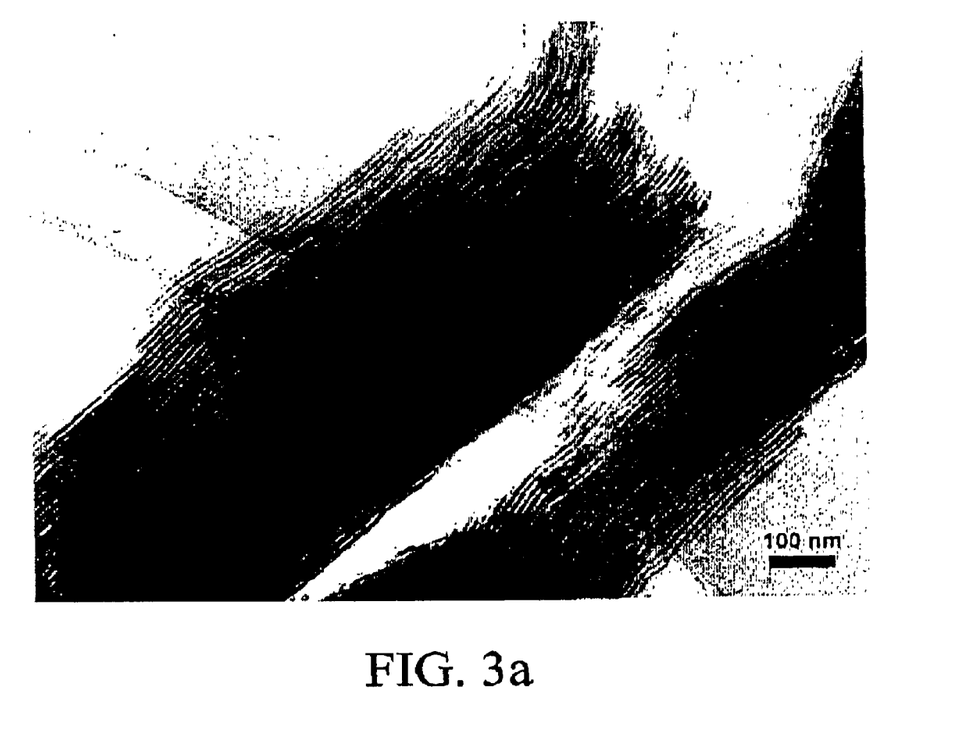
FIG. 3a is a TEM image of the composite of Pt nanowire bundles in MCM-41 viewed normally at magnification of 120000.
Figure 3B:
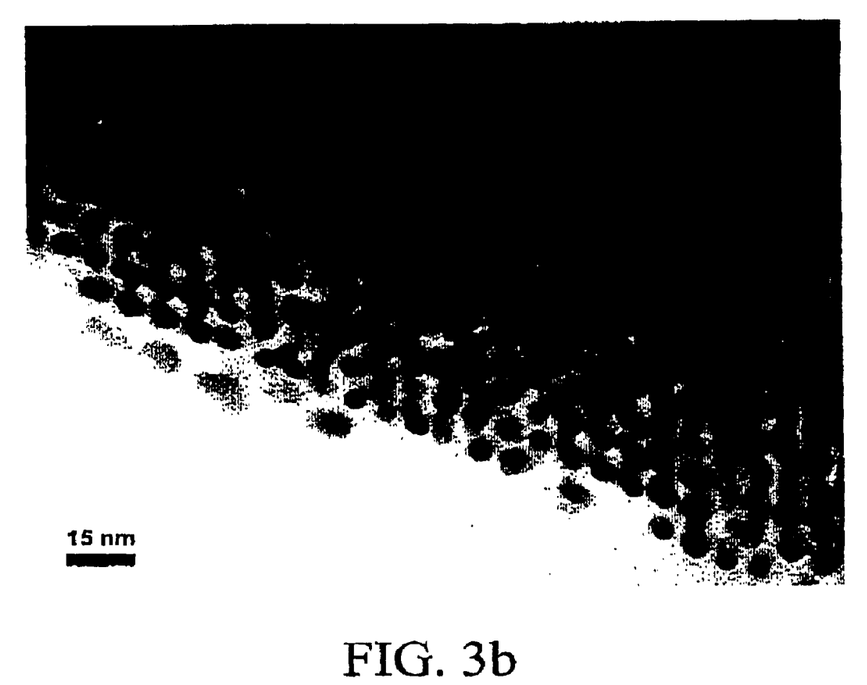
FIG. 3b is a TEM image of the composite of Pt nanowire bundles in MCM-41 viewed at magnification of 850000 along the axis of hexagonal pores according to the present invention.
Figure 4A:
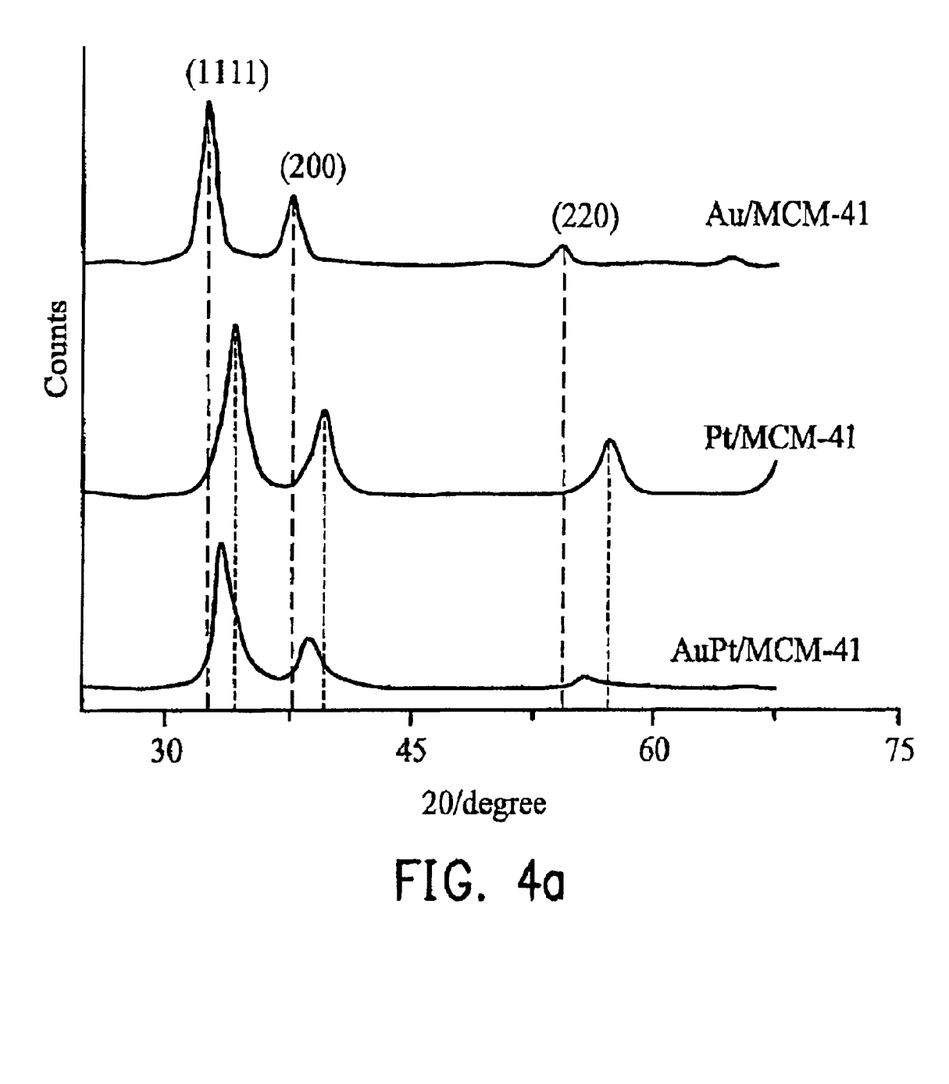
FIG. 4a shows a comparison of XRD patterns of the composite of pure Au, pure Pt and bimetallic AuPt nanowire bundles in MCM-41 according to the present invention.
Figure 4B:
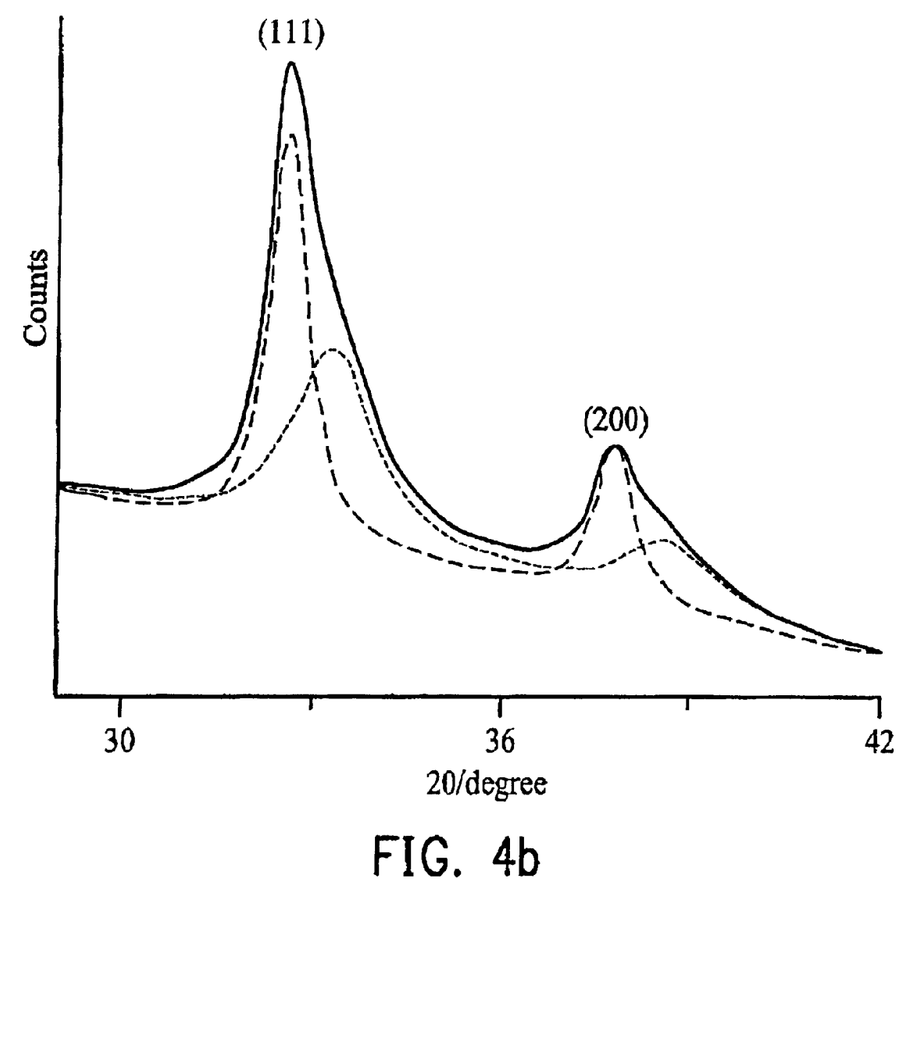
FIG. 4b shows magnification of (111) and (200) diffraction peaks of AuPt/MCM-41 (solid line) and the deconvoluted and simulated diffraction signals of two alloy phases (dashed and dotted line.
Figure 5:
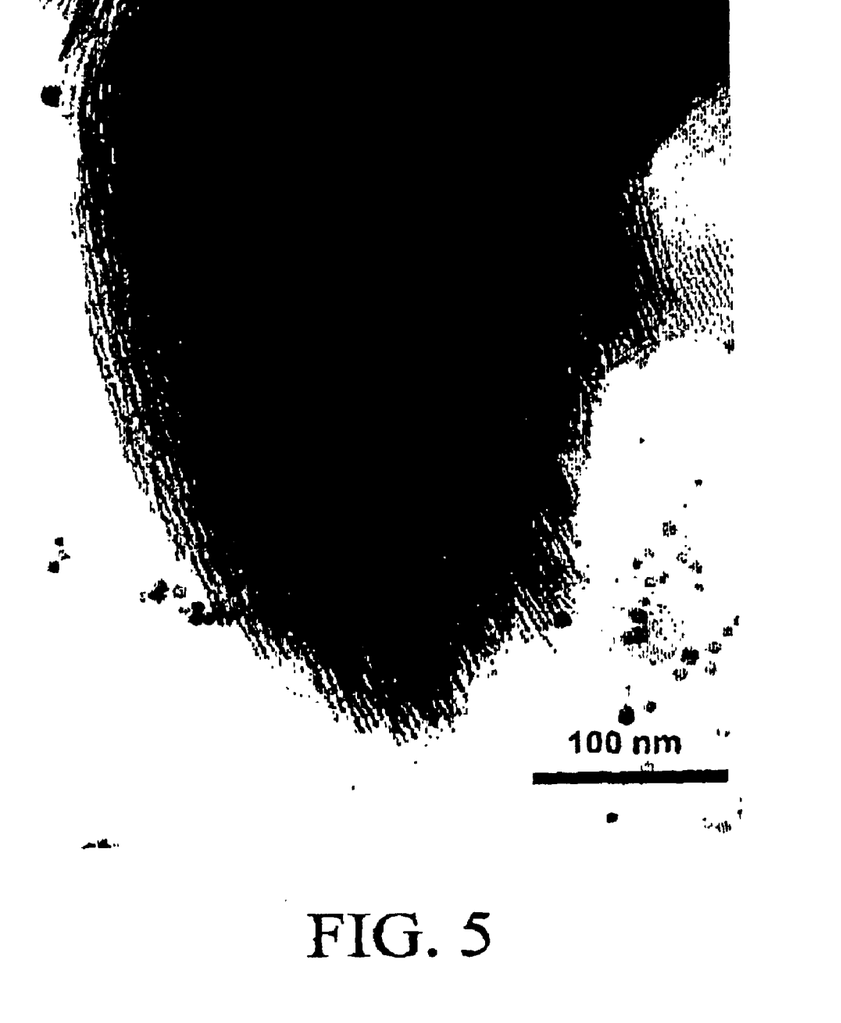
FIG. 5. shows TEM image of the composite of bimetallic AuPt nanowire bundles in MCM-41 according to the present invention.

TPMAC-MCM-41 as in Example 1 was mixed with saturated ethanol solution of $H_2PtCl_6 \cdot 6H_2O$ or $HAuCl_4 \cdot 3H_2O$, and was stirred for 3 hours. For AuPt/MCM-41 composites, mixture of $HauCl_4$ and $H_2PtCl_3$ by molar ratio of 1:1 was used. The mixture was then filtered, slightly washed with ethanol, and dried in ambient. The reduction process was conducted by heating the composite in $H_2$ flow at 150° C. for 3 hours. TEM images of the resulting Pt/MCM-41 revealed that reduced metal existed almost exclusively inside the channel pore of MCM-41, resulting in Pt nanowire bundles, as shown in FIG. 3a and FIG. 3b. The XRD analysis of bimetallic AuPt nanowire bundles demonstrated the nanocrystalline nature of the nanowire, as shown in FIGS. 4a and 4b. In FIG. 4a, the dash and dotted lines indicate the position of diffraction peaks of pure Au and Pt nanowires. In FIG. 4b, the (111) and (200) diffraction peaks of Au-Pt alloy nanowire in MCM-41 (solid line were deconvoluted and refined by Rietveld method into phase 1 (dashed line) and phase 2 (dotted line). The structural parameters of monometallic Pt or Au nanowire and bimetallic AuPt alloy nanowire in MCM-41 were derived and listed in Table 1. FIG. 5 shows TEM images of AuPt alloy nanowire bundles in MCM-41. ICP analysis of the AuPt/MCM-41 revealed Au and Pt loading of 29 wt. % and 15 wt. %.

TABLE 1

| Composite | Phase number | Cell dimension (nm) | Phase occupancy (%) | Au (%) | Pt (%) |
|---|---|---|---|---|---|
| Au/MCM-41 | | 0.40722(3) | 100 | 100 | 0 |
| AuPt/MCM-41 | 1 | 0.40521(4) | 43 | 86.5 | 13.5 |
| | 2 | 0.40097(5) | 57 | 59.5 | 40.5 |
| Pt/MCM-41 | | 0.39174(5) | 100 | 0 | 100 |

EXAMPLE 6

Formation of Pt Nanoparticles in TPEDA-MCM-41

Saturated aqueous solution of $Pt(NH_3)_6Cl_2$ was mixed and stirred with TPEDA-MCM-41 for 3 hours. After washing, filtration and drying, the composite was reduced in hydrogen flow at 300° C. for 5 hours. The temperature elevation rate was controlled at 1–5° C./min. The morphology of Pt in the channels of MCM-41 was found to be related to the reduction condition. For slow reduction in pure hydrogen flow, the major product was Pt nanowire bundles. If Pt was reduced by 10% hydrogen in nitrogen, or if the ramping rate was fast, highly dispersed Pt nanoparticles appeared in MCM-41. Table 2 lists the relationship between reduction conditions and the morphology of Pt. The average crystalline domain size was calculated from the peak width of (111) diffraction by Scherrer's equation with a spherical model.

TABLE 2

| Ramping rate (° C./min) | $H_2$ concentration (%) | Morphology | Average domain size (nm) |
|---|---|---|---|
| 1 | 100 | Nanowire | 4.5 |
| 1 | 10 | Nanoparticle | 2.2 |
| 5 | 100 | Nanoparticle | 2.4 |

EXAMPLE 7

Formation of Nanostructured Pd in TPMAC-MCM-48

Figure 6A:
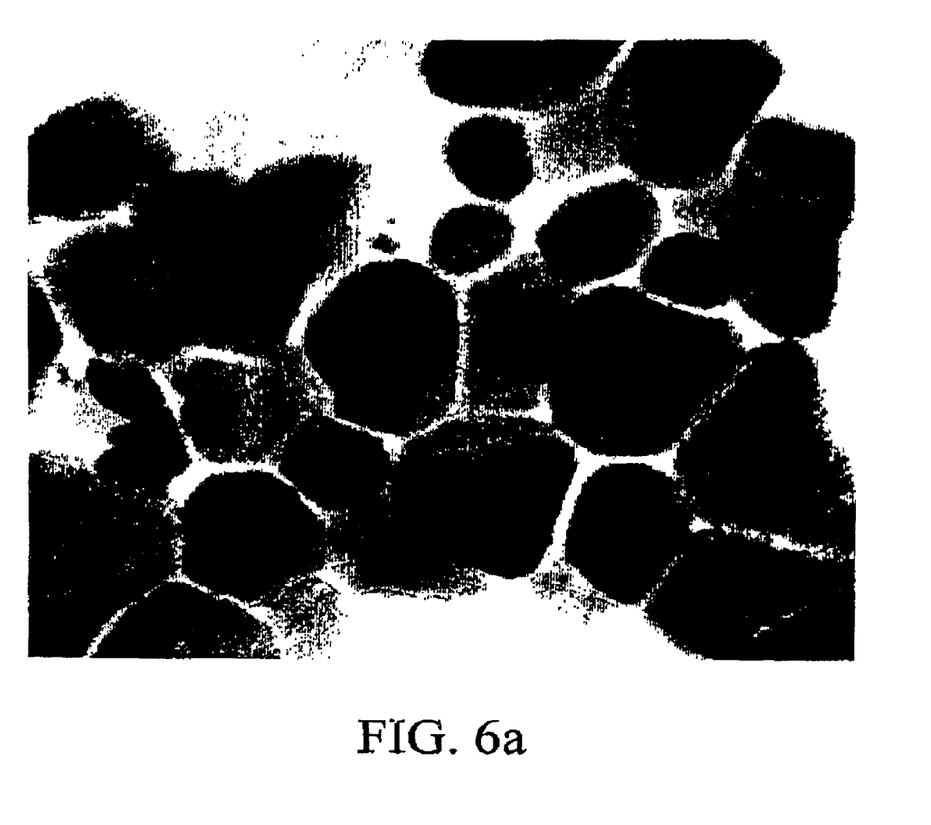
FIG. 6a is a TEM image of the Pd/MCM-48 composite according to the present invention at magnification of 40000.
Figure 6B:
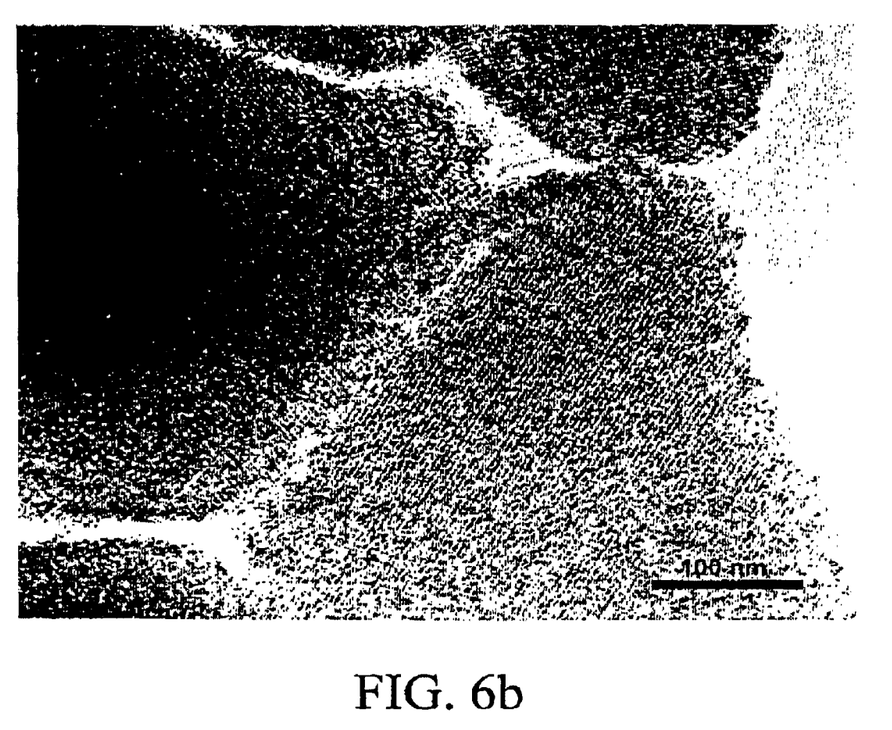
FIG. 6b is a TEM image of the Pd/MCM-48 composite according to the present invention at magnification of 120000.
Figure 6C:
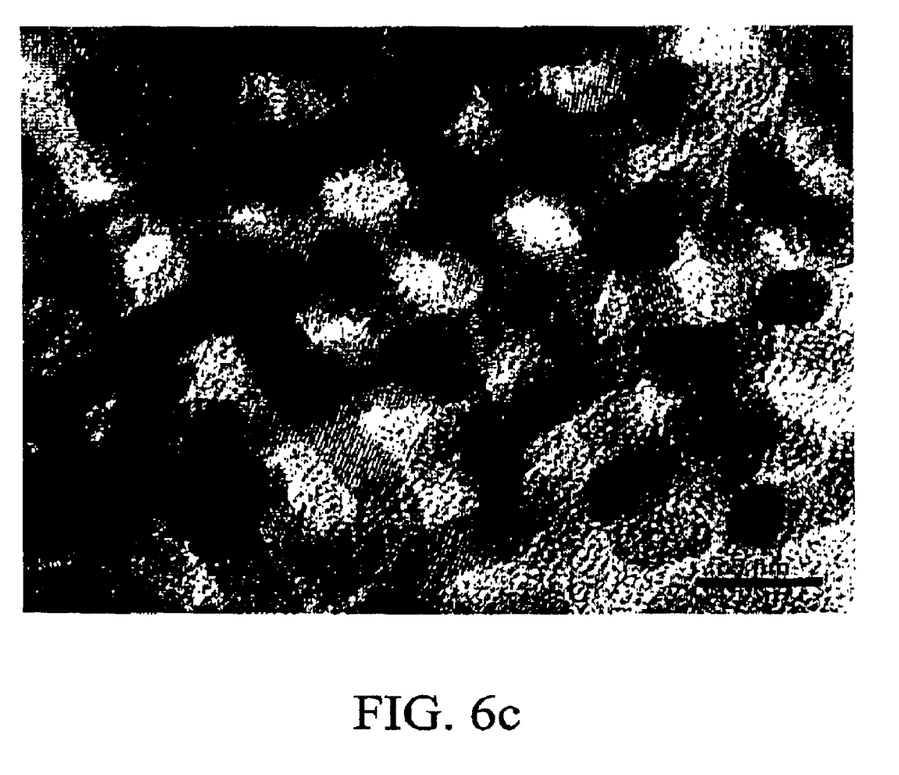
FIG. 6c is a TEM image of the Pd/MCM-48 composite according to the present invention at magnification of 2000000.
Figure 7:
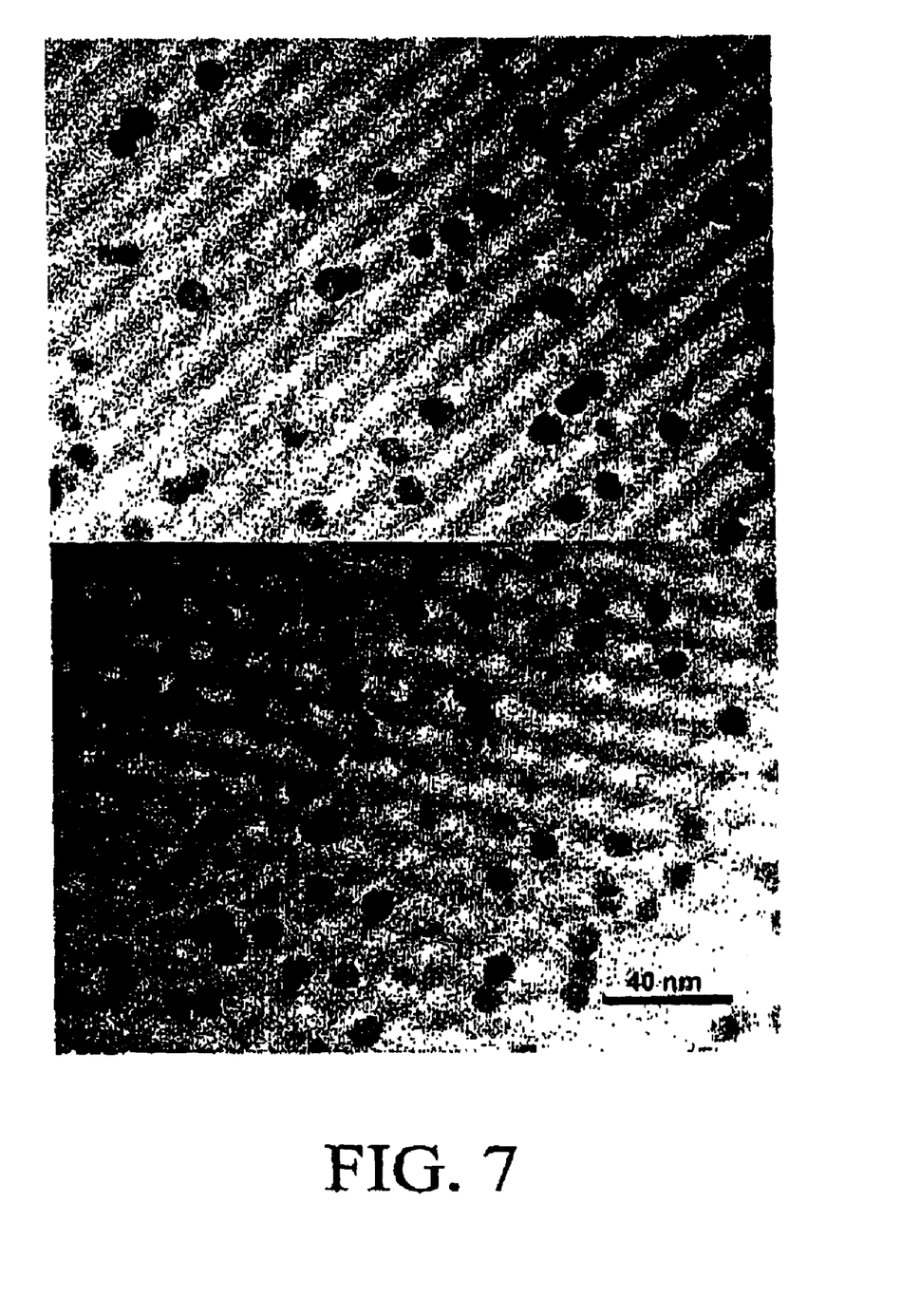
FIG. 7 shows TEM image of the Au/SBA-15 composite according to the present invention.

TPMAC-MCM-48 as in Example 2 was mixed with saturated aqueous solution of $(NH_4)_2PdCl_6$ and was stirred for 3 hours. The mixture was then filtered, slightly washed with water/ethanol, and dried in ambient. The reduction process was conducted by heating the composite in $H_2$ flow at 150° C. for 4 hours. The temperature elevation rate was controlled at 1° C./min. In FIG. 6a. FIG. 6b and FIG. 6c, TEM images of the Pd/MCM-48 composite reveal Pd nanowire networks in host MCM-48.

EXAMPLE 8

Formation of Bimetallic RuPt Nanoparticles in TPMAC-MCM-45

TPMAC-MCM-48 as in Example 2 was mixed with aqueous solution of $(NH_4)_2RuCl_6$ and $H_2PtCl_6$ with various molar ratio, and was stirred for 3 hours. The mixture was then filtered, slightly washed with water/ethanol, and dried in ambient. The reduction process was conducted by heating the composite in $H_2$ flow with ramping rate of 1° C./min to 400° C. and staying for 6 hours. Table 3 summarizes the relative amounts and particle sizes of prepared bimetallic RuPt nanoparticles in MCM-48,

TABLE 3

| Sample No. | Ru wt % | Pt wt % | Particle size (nm) |
| --- | --- | --- | --- |
| 1 | 1.6 | 7.2 | 2.5 |
| 2 | 2.2 | 5.8 | 2.2 |
| 3 | 5.4 | 3.9 | 1.9 |

EXAMPLE 9

Formation of Au Nanoparticles in TPMAC-SBA-15

TPMAC-SBA-15 as in Example 3 was mixed with ethanol solution of $HAuCl_4 \cdot 3H_2O$ and was stirred for 1 hour. The mixture was then washed thoroughly with ethanol and filtered. Yellow-colored composite was reduced by heating in $H_2$ flow at 120° C. for 3 hours. In FIG. 8, TEM image shows highly dispersed Au nanoparticles in SBA-15.

EXAMPLE 10

Formation of Nanostructure $Fe_2O_3$ in MCM-41

Functionalized MCM-41 was mixed with saturated aqueous solution of $(NH_4)_4Fe(CN)_6 \cdot xH_2O$ and was stirred for 3 hours. The mixture was then filtered, washed with water, and dried in ambient. The composite was heated in $O_2$ flow to 500° C. for 6 hours. The temperature elevation rate was controlled at 2° C./min.

EXAMPLE 11

Formation of Nanostructure $KCo(Fe(CN)_6)$ in TPMAC-SBA-15

TPMAC-SBA-15 was mixed with 1.0 M aqueous solution of $K_3Fe(CN)_6$ and was stirred for 1 hour. The mixture was then filtered, slightly washed with water and tried in ambient. 1.0 M aqueous solution of $CoCl_2 \cdot 6H_2O$ was then added to the composite, and the product was filtered and dried. The incorporation to $K_3Fe(CN)_6$ and $CoCl_2 \cdot 6H_2O$ was cycled for 1–3 times, The final product was filtered and dried in ambient.

EXAMPLE 12

Confined Growth of Squarate/Copper Nanocrystals in TPMAC-SBA-15

TPMAC-SBA-15 was mixed with saturated aqueous solution of squarate $H_2C_4O_4$ (Sq), with pH=8.5 adjusted by adding sodium hydroxide solution, and was stirred for 1 h. The mixture was then filtered and slightly washed with water. Saturated aqueous solution of copper acetate was then added to the composite, and the color of the composite turned yellowish-green immediately. The composite was dried at 50° C. IR spectrum indicates the coordination of squarate with copper.

EXAMPLE 13

Hydrogenation of Aromatics and Alkenes over Pr/SBA-15

Pt/SBA-15 was prepared as in Example 9 except $H_2PtCl_6 \cdot 6H_2O$ was used instead of $HAuCl_4 \cdot 3H_2O$. The Pt loading was determined to be 2.5 wt %. Hydrogenation of several armotics and alkenes were tested using Pt/SBA-15 as catalyst. The catalytic runs were undertaken in a fixed-bed continuous flow (1 atm) reactor at 150° C. Table 4 lists the reactant name and the resulting conversion and selectivity. The as-prepared Pt/SBA-15 catalyst shows great catalytic performance over other catalyst, for example, Ni-containing mesoporous silicas.

TABLE 4

| Reactant | Conversion (wt %) | Selectivity (wt %) |
| --- | --- | --- |
| $C_6H_6$ | 99.7 | ~100 |
| $C_6H_5CH_3$ | 98.0 | ~100 |
| $1,3,5-C_6H_3(CH_3)_3$ | 99.8 | 98 |

EXAMPLE 14

Preparation of Pt Nanostructures in Mesoporous Silica Film

Mesoporous silica film was deposited by dip-coating on pre-cleaned 4-inch (100) silicon wafer. The precursor solution was prepared by adding an ethanol solution of P123 to the silica sol-gel, which was made by refluxing a mixture of TEOS, $H_2O$, HCl and ethanol at 70° C. for 90 min. The molar ratios of reactants were 1 TEOS:0.01 P123:4.5 H2O:0.015 HCl:22 ethanol. The precursor solution was aged at room temperature for 4 hours prior to coating process. The dip-coating rate was 9 cm/min. After coating, the film was baked at 100° C. for 12 hours, followed by calcination at 450° C. for 60 min in a furnace with an air flow.

The film was functionalized with TPMAC by first treated in water vapor at 80° C. for 30 min, and then evacuated at 150° C. for 12 hours. The supported film was immersed in the mixture of toluene (5 mL) and TPMAC (1 mL) at 70° for 3 days. The functionalized silica film was then washed with toluene and ethanol, and dried in ambient. Next, the functionalized silica film was dipped in saturated ethanol solution of $H_2PtCl_6 \cdot 6H_2O$ for 3 days. The excess $H_2PtCl_6$ was washed out by ethanol, and the film was dried in air. The composite film was heated in hydrogen flow at 200° C. (ramping rate of 1° C./min) for 3 hours. XRD confirmed the ordered pore structure of mesoporous silica film, and the nanocrystalline Pt inside the film.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method of fabricating nanostructure materials in a functionalized mesoporous material, comprising:

(a) reacting functional molecules, consisting of functional group and attaching group, with the mesoporous material to form a monolayer of charged functional group on the pore surface of the mesoporous material;

(b) incorporating oppositely-charged molecules in the pores; and (c) forming nanostructured material in mesoporous material.

2. The method as claimed in claim 1, wherein the functional group is ionic, becomes ionic under certain pH environment.

3. The method as claimed in claim 1, wherein the functional group is selected from the group consisting of tetraalkylammonium, amines, alcohol, carboxylic acids, sulfonic acids, and phosphonic acids.

4. The method as claimed in claim 1, wherein the attaching group is selected from the group consisting of siloxane, chlorosilane, amine, alcohol, and combination thereof.

5. The method as claimed in claim 1, wherein the functional molecule is selected from the group consisting of N-trimethoxysilylpronyl-N,N,N-trimethylammonium chloride (TPMAC), N-trimethoxysilylpropyl-N,N,N-tri-n-butylammonium chloride (TPBAC), N-trimethoxysilylpropyl-3-guanidine chloride (TSPGC), 3-aminopropyltrimethoxysilane (APTS), N-(2-aminoethyl)-3-aminopropyltrimethoxysilane (AAPTS), bis[3-(trimethoxysilyl)propyl]ethylenediamine (BTPED), 3-trihydroxysilylpropylmethylphosphonate, sodium salt (TPMP), N-[(3-trimethoxysilyl)propyl]ethylenediamine triacetic acid, trisodium salt (TPEDA), diethylphosphatoethyltrimethoxysilane (DPETS) and diethyl (trimethoxysilylpropyl)malonate (DTSPM).

6. The method as claimed in claim 1, wherein the oppositely-charged molecule is negatively-charged molecule selected from the group consisting of metal halogen complexes, metal cyanide complexes, metal hydroxyl or oxo complexes, inorganic and organic acids and negatively-charged macromolecules and polymers.

7. The method as claimed in claim 1, wherein the oppositely-charged molecule is positively-charged molecule selected from the group consisting of metal ions, metal complexes, and positively-charged organic molecules, macromolecules and polymers.

8. The method as claimed in claim 1, wherein the oppositely-charged molecule is incorporated via ion exchange with the counter-ion of the functional group on the pore surface of host mesoporous material.

9. The method as claimed in claim 1, wherein the oppositely-charged molecule is incorporated via incipient wetness impregnation.

10. The method as claimed in claim 9, wherein the solution of oppositely charged molecule is a saturated or concentrated aqueous or ethanol solution.

11. The method as claimed in claim 1, wherein the oppositely-charged molecule is reduced to form nanostructured material.

12. The method as claimed in claim 11, wherein the reducing agent is selected from the group consisting of hydrogen gas, NaBH4, and alcohol.

13. The method as claimed in claim 11, wherein the nanostructured material is nanostructured metal.

14. The method as claimed claim 1, wherein the nanostructured metal is monometallic, bimetallic, or multimetallic.

15. The method as claimed in claim 1, wherein the oppositely-charged molecule is oxidized to form nanostructured metal oxide.

16. The method as claimed in claim 15, wherein the oxidizing agent is oxygen gas.

17. The method as claimed in claim 15, wherein the nanostructured metal oxide is mixed metal oxide with plurality of metal contents.

18. The method as claimed in claim 1, wherein the oppositely-charged molecule is treated with $H_2S$ to form nanostructured metal sulfide.

19. The method as claimed in claim 1, wherein the oppositely-charged molecule is further reacted with secondarily-incorporated molecule to form precipitate or nanocrystal in the confined space of mesoporous material.

20. The method as claimed in claim 19, wherein the secondary molecule is selected form the group consisting of metal chloride, squarate, oxalate, and metal hydroxide.

21. The method as claimed in claim 1, wherein the morphology of the nanostructured material is nanoparticle, nanowire, or nanowire bundle.

22. The method as claimed in claim 1, wherein the nanostructured material has high degree of dispersion inside the host mesoporous material.

23. The method as claimed in claim 1, wherein the amount of the nanostructured material is 3 to 80 parts by weight per 100 parts by weight of the host mesoporous material.

* * * * *